March 13, 1945.  A. MOSCH  2,371,308
POCKET UTENSIL HOLDER
Filed May 25, 1942  2 Sheets-Sheet 2
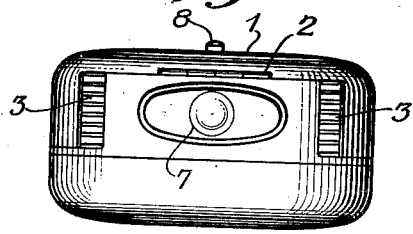
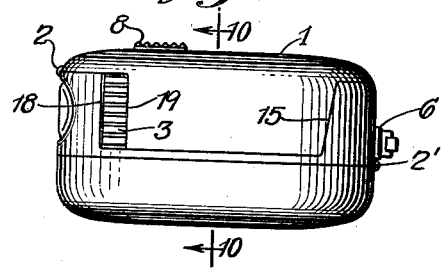
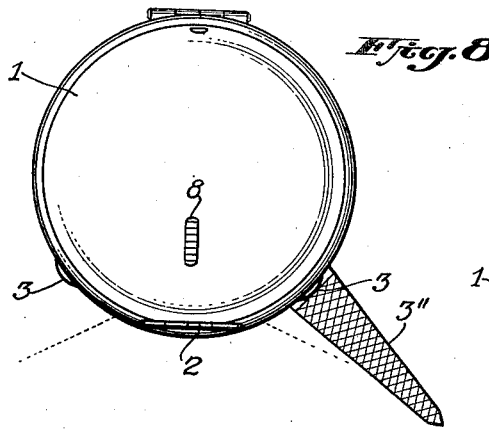
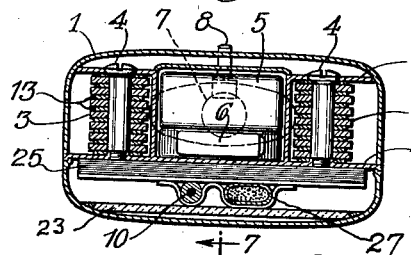
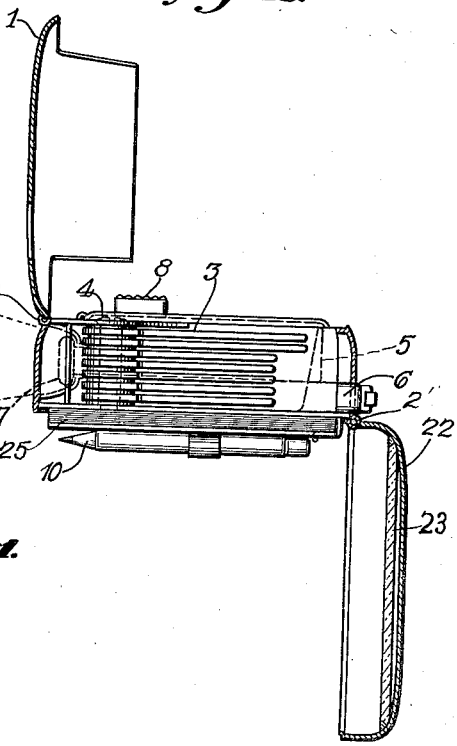
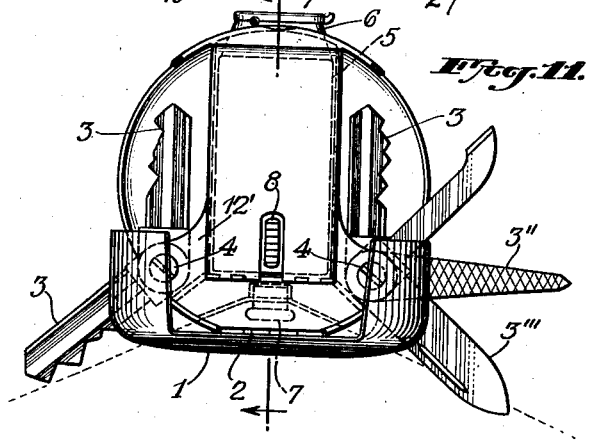
INVENTOR.
ALFRED MOSCH
BY Karl A. Mayr
ATTORNEY Patented Mar. 13, 1945

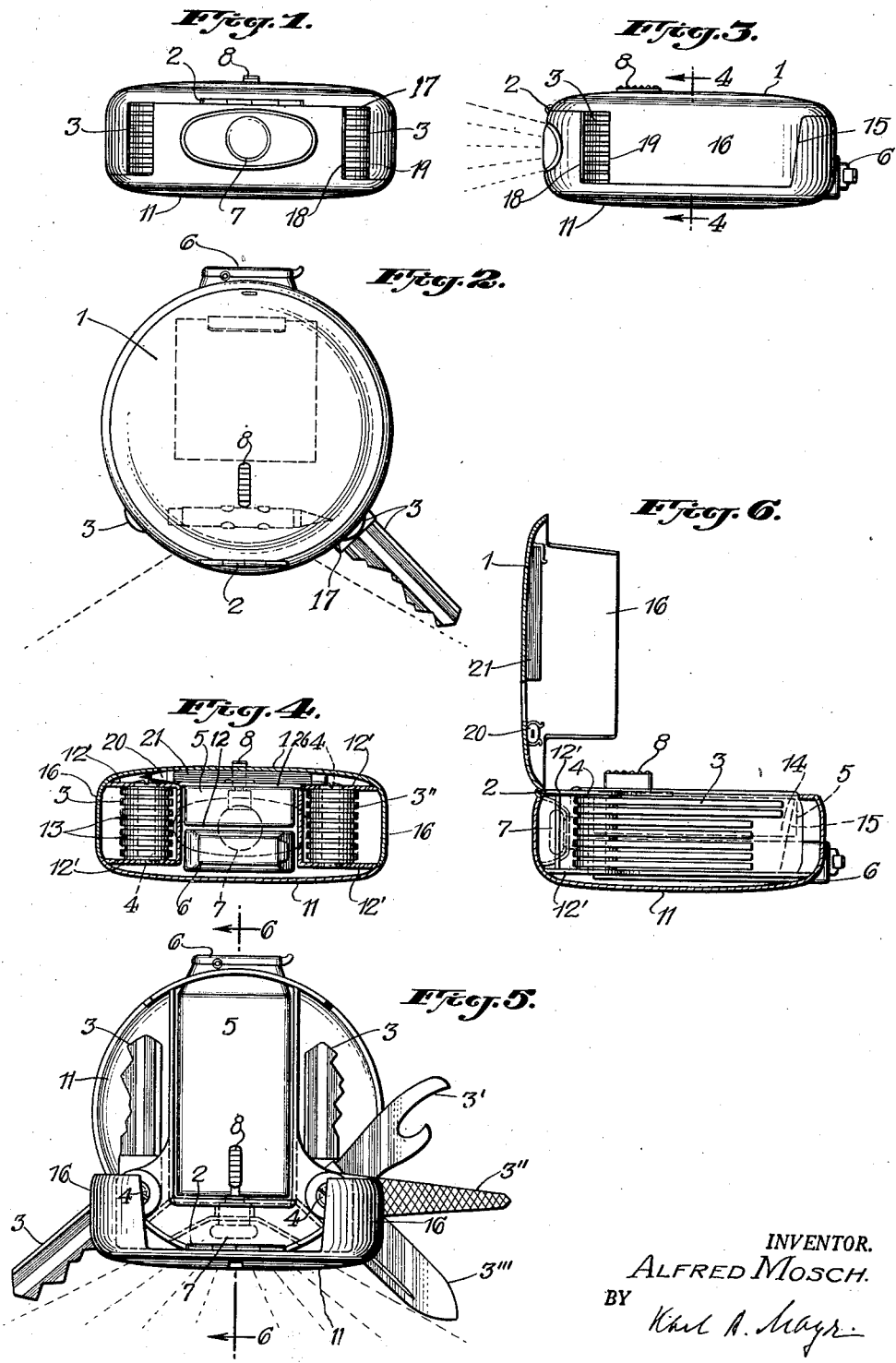

2,371,308

UNITED STATES PATENT OFFICE 2,371,308

POCKET UTENSIL HOLDER

Alfred Mesch, Bronx, N. Y.

Application May 25, 1942, Serial No. 444,351

3 Claims. (Cl. 206—38)

The present invention relates to a device for uniting, holding, incasing, and serving as a handle for utensils usually carried by men in their pockets, such as flashlight, lighter, keys, knife, bottle opener, nail file, paper pad, pencil, mirror, manicure tools, etc.; it may be adapted to serve women by making provisions for powder, rouge, lipstick, etc.

An object of the present invention is to provide a device of the type set forth comprising a casing having a cover which casing completely envelopes a plurality of utensils of the type described in a very compacted form, the device when closed, having an outside configuration which fits conveniently into the hand or the pocket or into a handbag.

A further object of the present invention is the provision of a device of the type set forth to the interior of which the utensils are swingably connected and can be selectively swung from the inside to the outside into operating position whereby, upon closing of the cover of the casing, the selected utensil is rigidly locked and fixed in its operating position and the casing and cover serve as a holder for the utensil.

Further and other objects and advantages of the invention will be apparent from the accompanying specification and claims and shown in the drawings which, by way of illustration, show what I now consider to be preferred embodiments of my invention.

In the drawings:

Figure 1 is a front view of the device according to the invention.

Figure 2 is a top view of the device shown in Fig. 1 with one utensil in operating position.

Figure 3 is a side view of the device shown in Fig. 1.

Figure 4 is a rear view of the device according to the invention with parts of the frame, casing, and cover cut off.

Figure 5 is a top view of the device according to Figs. 1 to 4 with the cover in opened position.

Figure 6 is a side view of the device with the cover in open position and a portion of the casing and cover broken off.

Figure 7 is a front view of a modification of the device according to the invention having two covers.

Figure 8 is a top view of the device shown in Fig. 7.

Figure 9 is a side view of the device shown in Fig. 7.

Figure 10 is a rear view of the device shown in Figs. 7 to 9 with parts of the casing, covers, and utensils broken off.

Figure 11 is a top view of the device according to Figs. 7 to 10 with one cover in open position.

Figure 12 is a side view of the device according to Figs. 7 to 11 with both covers opened and in section and also with the casing in section.

Like parts are designated by like numerals in all figures of the drawings.

The device according to the invention comprises a casing or shell having a member 11 which preferably has a rounded outside configuration and a cover member 1 hinged at 2 to member 11 and, when closed, forming therewith a body which conveniently fits into the hand and serves as a handle for some, if not all, of the implements which are stored in the casing. Within the casing a frame or body member 12 is provided having flat portions 12' which are arranged in pairwise parallel relation to one another and spaced from one another by column or pivot members 4. The latter serve as axes for the utensils to be stored in the casing such as keys 3, bottle opener 3', nail file 3'', and knife 3''' which can revolve about members 4 and are spaced from one another by washer members 13. At least the upper of the plates or carrier portions 12' is of such configuration that the utensils are not covered thereby and are open to be viewed and easily accessible when the cover or lid 1 is opened. In rest position the utensils are completely within the casing 11. The casing has lateral recesses 14 having a marginal portion 15 which is inclined with respect to the vertical. Cover 1 has laterally downwardly situated flap portions 16 which are of such configuration as to fit into the recesses 14 completely closing same with the exception of a slot shaped opening 17. When the cover is opened as shown in Figs. 5 and 6 the utensil which is desired to be used can be swung laterally out of the casing into operating position. By closing the cover the utensil is locked in operating position between marginal portion 18 of the recess in casing 11 and marginal portion 19 of flap portion 16 of cover 1. A pencil 20 and a writing pad 21 may be removably secured to the inside of cover 1. The central portion of the frame 12 comprises a compartment for accommodating a conventional flash light battery 5 and a conventional lighter 6. A light bulb 7 radiating through an opening in casing 11 to the outside and a switch 8 are also connected to frame 12. The compartment for the battery 5 may be closed by a lid 26 which is removed in Fig. 5.

Figures 7 to 12 show a modification of the device having two covers. The additional cover 22 is hinged at 2' to casing 11 in substantially diametrically opposed position with respect to light bulb 7. Cover 22 is used for carrying a mirror 23 and, when cover 22 is opened, the mirror is in such position with respect to the light bulb that the latter directly throws light on the object to be reflected by the mirror. A writing pad 25, a pencil 10, and a lipstick 27 is removably attached to the portion of the casing adjacent the inside of cover 22. A powder box may be inserted instead of the paper pad 25. In Fig. 11 a nail cleaner is shown instead of the bottle opener 3' shown in Fig. 5.

While I believe the above described embodiments of my invention to be preferred embodiments, I wish it to be understood that I do not desire to be limited to the exact details of design and construction shown and described, for obvious modifications will occur to a person skilled in the art.

I claim:

1. A pocket size device for holding a plurality of utensils, said device comprising, in combination, shell means adapted to be opened and closed and leaving openings when closed, said utensils extending through said openings when in operating position and being substantially enclosed within said shell means when in rest position and when said shell means are closed, a body member disposed substantially within said shell means and comprising a centrally located compartment holding an additional utensil, pivot means connected with said body member and disposed on either side of said compartment and individually swingably holding a set of said first mentioned utensils, abutment means disposed in the vicinity of each of said pivot means and limiting the swinging motion of said utensils in one direction, and said shell means comprising a member having marginal portions limiting the swing movement of said utensils in the opposite direction when said utensils are in operating position and said shell means are closed.

2. A pocket size device for holding a plurality of utensils such as keys, tools, and the like, comprising shell means composed substantially of two substantially oppositely positioned portions, body means disposed within said shell means and comprising holding means laterally swingably securely holding said utensils, one of said shell portions having a recessed portion, the other of said shell portions constituting a cover for closing said first shell portion and having a flap portion fitting into and adapted to close said recessed portion except for an opening disposed oppositely said holding means, said utensils, when in operating position, laterally protruding through said opening when said cover is closed and being completely within said casing when in rest position.

3. A pocket size device for holding a plurality of utensils, said device comprising, in combination, shell means comprising two cover members adapted to be opened and closed, one of said cover members leaving an opening when closed, said utensils protruding through said opening when in operating position and being substantially enclosed within said shell means when in rest position and when said shell means are closed, and a body member disposed substantially within said shell means and comprising pivot means swingably supporting said utensils, a mirror means disposed on the inside of the other of said cover members, said body member comprising a compartment having an opening and accommodating a flash light adapted to radiate light through said last mentioned opening to the outside, hinge means connected with said other cover member and being positioned substantially oppositely to said last mentioned opening.

ALFRED MOSCH.